Patented Nov. 30, 1943

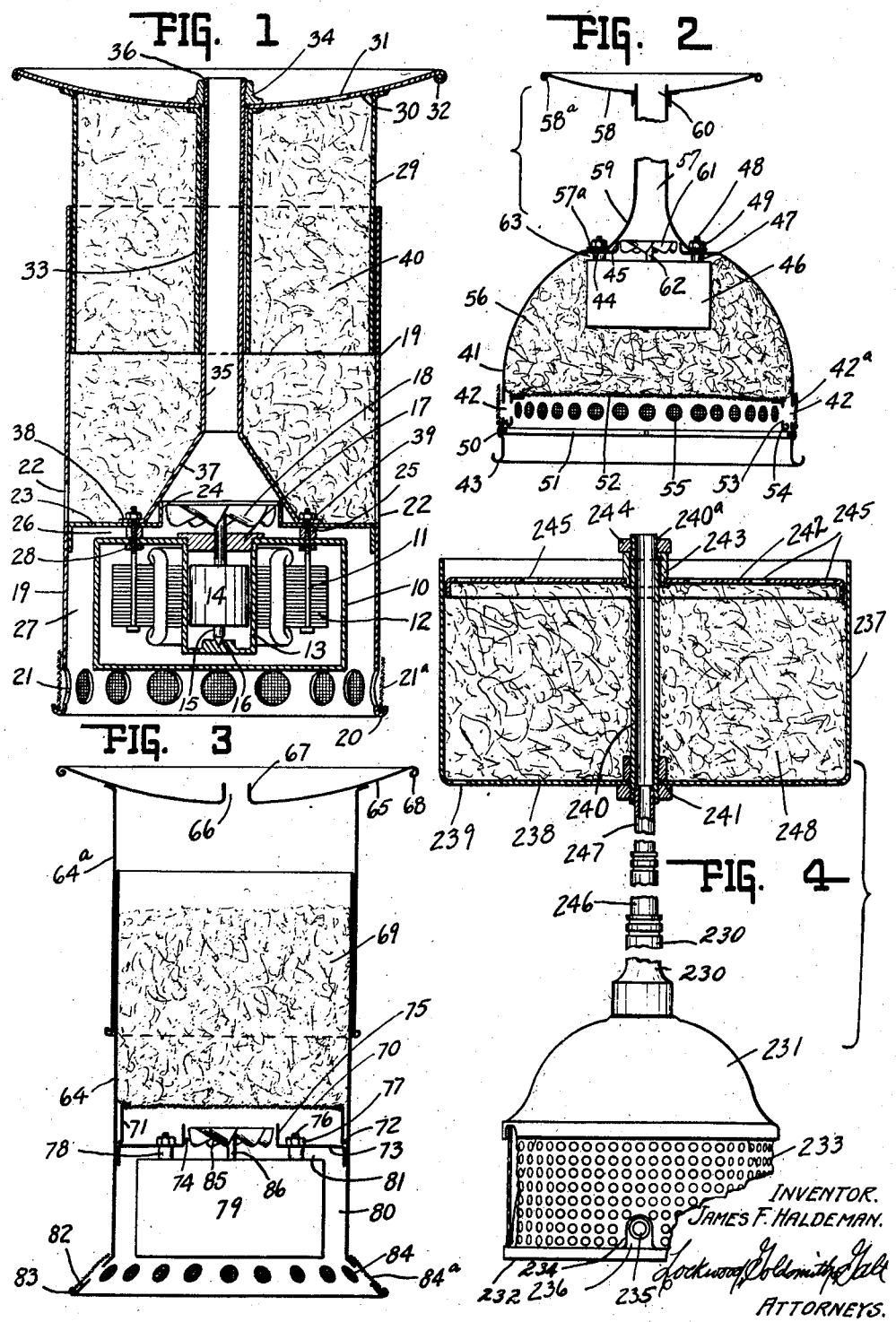

2,335,756

UNITED STATES PATENT OFFICE 2,335,756

AQUARIUM WATER CONDITIONING DEVICE

James F. Haldeman, Indianapolis, Ind.

Original application January 2, 1937, Serial No. 118,741, now Patent No. 2,275,428, dated March 10, 1942. Divided and this application February 24, 1942, Serial No. 432,118

20 Claims. (Cl. 210—122)

This invention relates primarily to a circulatory, filtering and aerating device, suitable for aquariums and the like.

The present invention is directed to a device of the aforementioned general character and wherein the device is adapted for positioning in and mounting upon the bottom of an aquarium for withdrawing water therefrom, aerating and filtering the same, and then returning the withdrawn water in aerated and filtered condition to the aquarium proper.

The chief object of this invention is to provide a structure which is relatively simple in construction and which is positive in its operation, and which may be readily applied to an aquarium, as hereinbefore recited.

The chief feature of the invention consists in the construction of the respective parts whereby a compact and in some instances, an adjustable structure is obtained, and also an arrangement is provided whereby the device may be readily disassembled for removal of the filtering medium for the cleaning thereof.

Another feature of the invention consists in providing a screen for the intake of the device to prevent clogging thereof by seaweed, moss, and the like.

This application is a division of application Serial No. 118,741, filed January 2, 1937, now Patent No. 2,275,428, dated March 10, 1942, and this application includes the subject matter of Interference No. 76,150.

Other objects and features will be more fully set forth hereinafter with reference to a detailed description of the several forms of the invention illustrated and described herein.

The full nature of the invention will be understood from the accompanying drawing and the following description and claims:

In the drawing,

Fig. 1 is a central sectional view of an embodiment of the invention, wherein the filter structure is of adjustable character and the pump and motor associated therewith are positioned beneath the filter and the pump includes a coaxial and upwardly directed discharge, the filtering system being of the gravity type.

Fig. 2 is a similar view of a modified form of the invention, the filter structure, in this instance, peripherally enveloping the electric motor and the filtering chamber being of separable character for removal of the filtering medium.

Fig. 3 is a view similar to Fig. 1 but of a modified form of the invention wherein the adjustable and separable character of the filter chamber is retained but the filter system is of the pressure supply type.

Fig. 4 is a vertical elevation of a modified form of the invention, the upper portion being shown in central section.

In Fig. 1 of the drawing, 10 indicates a sealed casing into which projects the bolts 11 that support a stator structure 12. In a well 13 is mounted a rotor 14 supported by a shaft 15 rotatably supported by the thrust bearing structure 16 and extending through a closure cap 17 and projecting upwardly above the casing 10. The projecting end of the shaft 15 mounts a pump impeller 18.

A tubular member 19 has a curled bottom periphery 20 forming a support adapted to bear on the bottom of the aquarium. The tubular member nearest its lower end is provided with a plurality of apertures 21 constituting the inlet of the device. The tubular member 19 in spaced relation to said holes 21 and above the same is provided with a plurality of apertures 22 constituting an outlet or discharge of the divice. A cylindrical screen 21a is retained by bead 29 and prevents seaweed, etc., from clogging the device.

Rigidly mounted in the tubular member 19 and extending transversely thereof is a support plate or partition 23 with an upwardly directed collar 24 that peripherally surrounds the impeller 18 and with the impeller forms the pump structure. Bushings 25 between the plate 23 and the casing 10 serve to maintain the latter in spaced relation to the former, forming the passage 26 therebetween. The casing 10 is of less cross sectional area than the tubular member 19, forming the passage 27 therebetween which communicates at its lower end with the apertures 21 and at is upper end with the passages 26.

A nut 28 on each of the bolts 11 serves to maintain the aforesaid parts in rigid and spaced relation and also serves to position the stator to predetermined relation in the sealed casing 10.

Another tubular member 29 is telescopically associated with the member 19 and its upper end is closed by a downwardly dished closure 30 having the apertures 31 discharging into the member and the curled and outwardly directed rim portion 32. The plate carries a depending tube 33 and a threaded member 34 registering therewith. A tube 35 has its upper end threaded as at 36 and its lower end terminates in an outwardly flared portion 37 which is provided with a flange 38 bearing on the plate 23, the former being rigidly secured thereto by the bolts 11 before mentioned. Included within the telescopically associated tubular members is filtering medium 49. This may be of any desired material. A convenient filtering member or medium is a sponge.

When the motor is energized, the pump impeller 18 is rotated and water is drawn from the main body in the aquarium through the openings 21 and thence around the casing 10 through passages 27 and 26 and thence through the neck 24 and upwardly through the flared portion 37, the tubular portion 35, thence the water discharges laterally and outwardly and downwardly into the semi-well formation formed by the closure 30. The water then trickles through the openings 31 in the plate 30, thence downwardly through the filtering structure and discharges through the outlets 22.

In Fig. 2 of the drawing, there is illustrated a modified form of the invention. The same herein includes a shell 41 provided with a plurality of peripheral apertures 42 spaced from the beaded or bottom supporting edge 43. A cylindrical screen 42a is retained by the adjacent enlargement 59 and prevents seaweed, et cetera, from clogging the device. The shell is extended upwardly and inwardly in hemispherical form and at its upper end is provided with an inturned portion 44 comparable to the supporting plate 23, shown in Fig. 1. The same at its inner end terminates in an aperture defined by the collar portion 45. The motor 46 is shown in elevation and is supported in suspended and spaced relation by the bushings 47 and the bolts 48 and nuts 49.

Adjacent the lower end and below the apertures 42 of the bell housing, as it were, is a groove 50. A split ring 51 is seatable therein and detachably retains a screen structure having the screen portion 52, the peripheral wall 53 and the supporting base portion 54. Wall 53 is also provided with apertures 55. Included within the chamber thus formed is the filtering medium 56 in the form of the sponge, or the like, and the same peripherally encircles the motor.

Suitably secured to the aforesaid and by means of the bolts 48 is a tubular discharge 57 having the anchoring flange 57a and the intermediate flared portion 59. Telescopically or rigidly associated with the upper end of the tubular discharge 57 is the dished formation 58 terminating in a beaded periphery 58a and having the tubular portion 60 associated with the upper end of the tube 57. Mounted in the tapered chamber or rather the cylindrical portion thereof defined by the collar 45, is the pump impeller 61 carried by the shaft 62 of the motor.

When the device is positioned in the aquarium, the water in the aquarium is drawn through the openings 42, thence through openings 55, thence through the screen 52, through the filtering medium 56 and thence through passage 63 between the motor 46 and the portion 44, through the pump 61 and thence discharges upwardly through the tube 57 and into the dished portion 58. The water flows over the peripheral edge 58a thereof, thus resulting in the filtered water, becoming aerated. This is a suction type of filtering system.

In Fig. 3 of the drawing, there is illustrated a form of the invention somewhat similar to that shown in Fig. 1, in that the tubular telescopic structure arrangement is disclosed and this form of the invention is similar to that shown in Fig. 2 in that it is other than the gravity filtering type and furthermore, it is similar to that shown in Fig. 2 in that it is of an overflowing lateral discharge type. In Fig. 3 the numeral 64 indicates a tubular member open at the upper end and telescopically associated with another tube 64a, the upper end of which has secured to it a closure 65 with a central aperture 66 therein defined by collar 67 that extends upwardly an appreciable height. The closure 65 projects laterally beyond the tubular portion 64 and terminates in a rimmed edge 68. This closure 65 is of concave type and the water normally flows over the peripheral edge 68 when the pump is in operation.

Enclosed by the telescopic tubular members is the filtering medium such as a sponge 69, the lower end of which rests on the screen 70 supported by a collar 71, the lower edge of which is flanged as at 72 and bears on a plate 73 carried by the tubular member 64 intermediate the ends thereof.

The plate 73 is centrally apertured as at 74 and the same is defined by an upstanding collar 75 constituting a pump housing. The bolts 76 by means of nut 77 support in spaced relation through the sleeves 78 the motor 79 positioned in the lower chamber in the tubular member 64 but in spaced relation thereto, forming the passage 80 thereabout and a communicating passage 81 thereabove. The lower end of the tubular portion 64 is flared outwardly as at 82 and terminates in a beaded rim 83. The inclined portion 82 is apertured as at 84 and constitutes the intake of the device. A conical screen 84a is retained by the bead 83 and prevents seaweed, et cetera, from clogging the device.

The water cycle is as follows: Water from the aquarium enters the intake openings 84, passes upwardly through passage 80 and thence through passage 81 to the pump structure. The pump structure includes the pump impeller 85 carried by the motor shaft 86 in the pump housing, as it were, 75. The water is then forced upwardly through the screen 70 and thence through the filter or sponge 69 and thence out through the opening 66 and over the closure 65. As it discharges over the rimmed edge 68 and returns to the aquarium, it is aerated.

In each of these structures, the motor is submerged below the normal liquid level in the aquarium and is suitably sealed against water penetration. The shaft of the motor extends upwardly and on the exposed end is mounted the pump which sucks water through a screened intake arrangement.

In Fig. 1 the pump supply is laterally dispersed, then passes through the filter and discharges to the aquarium, in Fig. 2, the pump supply previously has been drawn through the filter and is discharged laterally from edge 58a, while in Fig. 3 the pump supply is forced through the filter and then discharged laterally to the filter, in each instance, edge 32 of Fig. 1, edge 58a of Fig. 2 and edge 68 of Fig. 3 being positioned above the normal liquid level in the aquarium.

In Fig. 4 there is disclosed a modified form of the invention and the form which has been extensively commercialized. It is similar broadly to the forms previously described. In Fig. 4, numeral 230 indicates a standpipe construction comparable to tube 57 in Fig. 2, 231 a filter shell comparable to the shell 41, 232 a base comparable to base 43 only of closed character. The two parts 231 and 232 are spaced apart and a screen 233 protects the intake of the device and thus prevents clogging of the device. 234 indicates an aperture in the screen 233 through which projects portion 235, the electrical supply to the device, the motor and pump portion of the device being indicated by numeral 236 and outlined by the broken lines in the screen area of the figure.

The upper portion of the device is illustrated in vertical section in Fig. 4 wherein a filter chamber 237 has an open end and includes a bottom 238 apertured at 239. A riser 240 is suitably secured therein at 241 and supports a filter medium retaining plate 242 at the upper threaded end 240a by means of the tubular portion 243, locked by nut 244. Plate 242 is apertured at 245. Tube 230 telescopically supports tube 246 which similarly supports tube 247 having threaded connection with riser 240. The filtering medium 248 in the form of a sponge or like is included in the filter chamber.

The water cycle is as follows: Water passes through screen 233, thence through the pump structure and tubes and riser, discharging therefrom onto plate 241. The water passes through openings 245 and after passing through the filtering medium 248 discharges to the aquarium through openings 239.

For the preferred detail construction of this interior arrangement, reference is had to Patent No. 2,004,866, dated June 11, 1935.

While the invention has been illustrated and described herein in great detail, the same is to be considered illustrative and not restrictive in character. The invention as thus described and illustrated, as well as other modifications thereof hereinbefore suggested, together with other modifications which will readily suggest themselves to persons skilled in this art, are all considered to be within the broad scope of the invention, reference being had to the appended claims.

The invention claimed is:

1. A self-contained portable unitary structure, comprising in combination, a base having an electric motor water sealed therein, a casing mounted above said base having a pump mounted therein, a vertically extending conduit projecting upwardly from said casing and adapted to be supported by and maintained in position by said base, and a receptacle surrounding at least the upper end of said conduit, said receptacle having a drainage opening at its lower end and being filled with a filtering material, the conduit projecting above the top of said filtering material and adapted to deliver the water supplied through said conduit by said pump over the top of said filtering material.

2. A self-contained portable unitary filter structure, comprising in combination a base portion, an electric motor water sealed therein, a casing portion above the base portion and having a pump therein, a vertically extending conduit projecting upwardly from said casing portion and supported thereby, a receptacle surrounding at least the upper end of said conduit, said receptacle having a lower end drainage opening and filled with a filtering material, the conduit projecting above the top of the filtering material and adapted to deliver the water supplied through said conduit by said pump over the top of the filtering material.

3. A structure as defined by claim 2, characterized by the receptacle and conduit, each being of two-part character, the two parts being telescopically connected together.

4. A structure as defined by claim 2, wherein a perforated plate is positioned above the filtering material and extends across the receptacle from substantially the side wall thereof to the conduit.

5. A structure as defined by claim 2, wherein a perforated plate is positioned above the filtering material and extends across the receptacle from substantially the side wall thereof to the conduit, the receptacle and conduit each being of two-part character, the two parts being telescopically connected together and the perforated plate being rigid with each.

6. A self-contained portable unitary structure, comprising in combination a base portion having a screened intake into the same, an electric motor water sealed therein, a pump chamber forming casing portion supported by the base portion and having an upwardly directed discharge, a pump in the chamber operable by said electric motor, a filter material receiving receptacle thereabove and supported by the base portion, the pump casing and receptacle having communication for water series flow therethrough and the filtering material in the receptacle, the pump chamber discharging to the receptacle through a foraminated-like means across the receptacle.

7. A structure as defined by claim 6, characterized by the receptacle being of two-part adjustable character, the two parts being telescopically connected together for receptacle size adjustment.

8. A structure as defined by claim 6, wherein a vertical conduit is interposed between the receptacle and the pump casing portion and has its lower end connected to the latter.

9. A structure as defined by claim 6, wherein a vertical conduit is interposed between the receptacle and the pump casing portion and has its lower end connected to the latter, the conduit and receptacle each being of two-part character, the two parts being telescopically connected together.

10. A structure as defined by claim 6, wherein a vertical conduit is interposed between the receptacle and the pump casing portion and has its lower end connected to the latter, the conduit and receptacle each being of two-part character, the two parts being telescopically connected together, the foraminated-like means being rigid with the one of movable parts of each of the receptacle and conduit.

11. A self-contained portable unitary structure, comprising in combination a base portion, a screened intake into same, a water sealed electric motor in the base portion, a pump casing portion, a pump therein and above and supported by the base portion and operable by said electric motor, a vertically directed conduit supported by the pump casing portion, a filter chamber carried by the base portion, filtering material in said chamber and to which said conduit discharges, and an outlet from the chamber, pumpage passing through the material to the outlet for discharge.

12. A self-contained and self-sustaining portable unitary, circulatory filtering and aerating structure for aquariums and the like, including in combination a base portion having a laterally directed screened opening into the same near the bottom thereof for intake purposes, a water sealed electric motor within the base portion, a pump chamber open at its lower end to the base portion and discharging upwardly, a pump in said chamber and operable by said electric motor, a filtering chamber portion, an outlet therefrom, and filtering material in the filtering chamber, the pumpage passing through the material to the outlet for filtering purposes.

13. A structure as defined by claim 12, wherein a filter material retaining member is provided at the upper end of the filtering chamber, said filter material retaining member normally projecting outwardly from and upwardly beyond the upper portion of the filtering chamber.

14. A structure as defined by claim 12, wherein the filtering material substantially peripherally encloses the water sealed motor.

15. A structure as defined by claim 12, wherein the filtering material substantially peripherally encloses the water sealed motor, the pump drawing the water through the filtering material.

16. A self-contained and self-sustaining portable unitary, circulatory filtering and aerating structure for aquariums and the like, including in combination a base portion having a laterally directed screened opening near the bottom for intake purposes, a water sealed electric motor within the base portion, a pump chamber open at its lower end to the base portion and discharging upwardly, a pump in said chamber, said electric motor operating said pump, a filtering chamber portion substantially thereabove and adapted to receive pump discharge and having filtering material therein, the pump discharge passing through the latter for filtering purposes, the pump forcing the water upwardly through the filtering material.

17. A self-contained and self-sustaining portable unitary, circulatory filtering and aerating structure for aquariums and the like, including in combination a base portion having a laterally directed screened opening near the bottom for intake purposes, a water sealed electric motor within the base portion, a pump chamber open at its lower end to the base portion and discharging upwardly, a pump in said chamber said electric motor operating said pump, a filtering chamber portion substantially thereabove and adapted to receive pump discharge and having filtering material therein, the pump discharge passing through the latter for filtering purposes, the pump discharging to a vertical conduit extending upwardly from the pump chamber and terminating above the filtering material in its chamber, said conduit delivering the water thereto over the top of the material.

18. A self-contained and self-sustaining portable unitary, circulatory filtering and aerating structure for aquariums and the like, including in combination a base portion having a laterally directed screened opening near the bottom for intake purposes, a water sealed electric motor within the base portion, a pump chamber open at its lower end to the base portion and discharging upwardly, a pump in said chamber said electric motor operating said pump, a filtering chamber portion substantially thereabove and adapted to receive pump discharge and having filtering material therein, the pump discharge passing through the latter for filtering purposes, the pump discharging to a vertical conduit extending upwardly from the pump chamber and terminating above the filtering material in its chamber, said conduit delivering the water thereto over the top of the material, and foraminated means for retaining the material in its chamber and distributing the conduit discharge over the top thereof.

19. A self-contained and self-sustaining portable unitary, circulatory filtering and aerating structure for aquariums and the like, including in combination a base portion having a laterally directed screened opening near the bottom for intake purposes, a water sealed electric motor within the base portion, a pump chamber open at its lower end to the base portion and discharging upwardly, a pump in said chamber said electric motor operating said pump, a filtering chamber portion substantially thereabove and adapted to receive pump discharge and having filtering material therein, the pump discharge passing through the latter for filtering purposes, the pump discharging to a vertical conduit extending upwardly from the pump chamber and terminating above the filtering material in its chamber, said conduit delivering the water thereto over the top of the material, the pump and motor having a common shaft and in coaxial alignment and aligned with the conduit.

20. A self-contained and self-sustaining portable unitary, circulatory filtering and aerating structure for aquariums and the like, including in combination a base portion having a laterally directed screened opening near the bottom for intake purposes, a water sealed electric motor within the base portion, a pump chamber open at its lower end to the base portion and discharging upwardly, a pump in said chamber said electric motor operating said pump, a filtering chamber portion substantially thereabove and adapted to receive pump discharge and having filtering material therein, the pump discharge passing through the latter for filtering purposes, the pump discharging to a vertical conduit extending upwardly from the pump chamber and terminating above the filtering material in its chamber, said conduit delivering the water thereto over the top of the material, the filtered water discharging from the bottom portion of the filter material containing chamber.

JAMES F. HALDEMAN.